(12) United States Patent
Dong (10) Patent No.: US 10,817,282 B2
(45) Date of Patent: Oct. 27, 2020

(54) APPLICATION CONFIGURATION FILE GENERATION METHOD AND APPARATUS, APPLICATION PAGE DISPLAY METHOD AND APPARATUS AND STORAGE MEDIUM

(71) Applicant: BEIJING XIAOMI MOBILE SOFTWARE CO., LTD., Beijing (CN)

(72) Inventor: Hongguang Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/352,997

(22) Filed: Mar. 14, 2019

(65) Prior Publication Data

US 2019/0294433 A1    Sep. 26, 2019

(30) Foreign Application Priority Data

Mar. 20, 2018    (CN) .......................... 2018 1 0231799

(51) Int. Cl.
*G06F 8/71* (2018.01)
*G06F 8/41* (2018.01)
*G06F 8/70* (2018.01)
*G06F 8/30* (2018.01)

(52) U.S. Cl.
CPC .................. *G06F 8/71* (2013.01); *G06F 8/30* (2013.01); *G06F 8/41* (2013.01); *G06F 8/70* (2013.01)

(58) Field of Classification Search
CPC ....................................................... G06F 8/71
USPC ....................................................... 717/121
See application file for complete search history.

(56) References Cited

U.S. PATENT DOCUMENTS

| 7,565,364 | B1 | 7/2009 | Darcy et al. |
| 2002/0038368 | A1 | 3/2002 | Kojima et al. |
| 2005/0187945 | A1 | 8/2005 | Ehrich et al. |
| 2009/0113401 | A1 | 4/2009 | Cipresso et al. |
| 2011/0145801 | A1 | 6/2011 | Kaplinger et al. |
| 2017/0075668 | A1* | 3/2017 | Selvi ................. G06F 8/447 |
| 2017/0115971 | A1* | 4/2017 | Pamer ................ G06F 8/437 |
| 2018/0052682 | A1* | 2/2018 | Fox ................... G06F 8/751 |

OTHER PUBLICATIONS

Partial European Search Report issued in European Patent Application No. 19163982.2, dated Aug. 8, 2019, (15p).

(Continued)

*Primary Examiner* — John Q Chavis
(74) *Attorney, Agent, or Firm* — Arch & Lake LLP (57) ABSTRACT

An application configuration file generation method and apparatus, an application page display method and apparatus, and a storage medium are provided. The method includes: acquiring a source code file of an application page, where the source code file of the page comprises a plurality of variable declarations and access mode description information corresponding to at least part of the variable declarations. The method further includes compiling the acquired source code file to obtain an application configuration file, where the configuration file comprises a code file for describing the application page, the code file comprises an access mode description statement, and the access mode description statement is configured to describe a corresponding relationship between variable data and an access mode in a corresponding page.

14 Claims, 4 Drawing Sheets

(56) References Cited

OTHER PUBLICATIONS

Extended European Search Report of counterpart European Patent Application No. 19163982.2 dated Nov. 26, 2019, (18p).
Gervasi, Vincenzo et al., "Software Manipulation with Annotations in Java", Intelligent Virtual Agent. IVA 2015. LNCS; [Lecture Notes in Computer Science; Lect. Notes Computer], Springer, Berlin, Heidelberg, Jul. 8, 2007, (24p).

* cited by examiner

FIG. 1 (Prior Art)

| Acquiring a source code file of an application page, wherein the source code file of the page includes a plurality of variable declarations and access mode description information corresponding to at least part of the variable declarations | 201 |

↓

| Compiling the acquired source code file to obtain an application configuration file | 202 |

FIG. 2

| Acquiring a source code file of an application page, wherein the source code file of each page comprises a plurality of variable declarations and at least one access mode section | 301 |

↓

| Compiling the acquired source code file to obtain an application configuration file | 302 |

FIG. 3

| Acquiring a source code file of an application page, wherein the source code file of each page comprises variable declarations and access mode annotations corresponding to at least a part of the variable declarations | 401 |

↓

| Compiling the code file to obtain an application configuration file | 402 |

APPLICATION CONFIGURATION FILE GENERATION METHOD AND APPARATUS, APPLICATION PAGE DISPLAY METHOD AND APPARATUS AND STORAGE MEDIUM

CROSS-REFERENCE TO RELATED APPLICATION

The present disclosure is based on and claims priority to Chinese Patent Application No. 201810231799.3, filed on Mar. 20, 2018, the entire contents of which are incorporated herein as reference.

TECHNICAL FIELD

The present disclosure relates to the technical field of computers, and particularly to a method for obtaining an application configuration file and apparatus, an application page display method and apparatus, and a storage medium.

BACKGROUND

With the progress of electronic technology and improvement of the configuration of intelligent terminals, a variety of applications can be installed and various application pages can be displayed on terminals for users to use. As application's functionalities are gradually perfected, more and more storage space is occupied gradually, which probably affects the normal performance of an operating system. In order to reduce the storage space occupied by the applications, a technology that can run the application in a situation where the application is not installed on the terminal appears.

SUMMARY

The present disclosure provides a method for obtaining an application configuration file and apparatus, an application page display method and apparatus, and a storage medium. The technical solutions are as follow.

According to a first aspect of the present disclosure, there is provided an application configuration file generation method. The method may include: acquiring a source code file of an application page, wherein the source code file of the page comprises a plurality of variable declarations and access mode description information corresponding to at least part of the variable declarations; and compiling the acquired source code file to obtain an application configuration file, wherein the configuration file comprises a code file for describing the application page, the code file comprises an access mode description statement, and the access mode description statement is configured to describe a corresponding relationship between variable data and an access mode in a corresponding page.

According to a second aspect of the present disclosure, there is provided an application page display method. The method may include: acquiring an application configuration file, wherein the configuration file comprises a code file for describing an application page, the code file comprises an access mode description statement, and the access mode description statement is configured to describe a corresponding relationship between variable data and an access mode in a corresponding page; acquiring a page request which comprises a page identifier and variable data; acquiring page data corresponding to the page identifier, from the configuration file; and displaying a page indicated by the page identifier, in the situation where an application is not installed on an operating system, according to the access mode description statement in a code file of the page indicated by the page identifier and in accordance with page data corresponding to the page identifier and variable data in the page request.

According to a third aspect of the present disclosure, there is provided an application configuration file generation apparatus. The apparatus may include: an acquisition module configured to acquire a source code file of an application page, wherein the source code file of the page comprises a plurality of variable declarations and access mode description information corresponding to at least part of the variable declarations; and a compilation module configured to compile the source code file acquired by the acquisition module to obtain an application configuration file, wherein the configuration file comprises a code file for describing the application page, the code file comprises an access mode description statement, and the access mode description statement is configured to describe a corresponding relationship between variable data and an access mode in a corresponding page. Wherein, the access mode may public, private, or restricted.

According to a fourth aspect of the present disclosure, there is provided an application page display apparatus. The apparatus may include a file acquisition module configured to acquire an application configuration file, wherein the configuration file comprises a code file for describing an application page, the code file comprises an access mode description statement, and the access mode description statement is configured to describe a corresponding relationship between variable data and an access mode in a corresponding page; a request acquisition module configured to acquire a page request which comprises a page identifier and variable data; a data acquisition module configured to acquire page data corresponding to the page identifier, from the configuration file; and a display module configured to, in the situation where an application is not installed on an operating system, display a page indicated by the page identifier according to the access mode description statement in a code file of the page indicated by the page identifier and in accordance with page data corresponding to the page identifier and variable data in the page request.

According to a fifth aspect of the present disclosure, there is provided an application configuration file generation apparatus. The apparatus includes: a processor; and a memory for storing instructions executable by the processor. The processor is configured to: acquire a source code file of an application page, wherein the source code file of the page comprises a plurality of variable declarations and access mode description information corresponding to at least part of the variable declarations; and compile the acquired source code file to obtain an application configuration file, wherein the configuration file comprises a code file for describing the application page, the code file comprises an access mode description statement, and the access mode description statement is configured to describe a corresponding relationship between variable data and an access mode in a corresponding page According to a sixth aspect of the present disclosure, there is provided an application page display apparatus. The apparatus includes: a processor; and a memory for storing instructions executable by the processor. The processor is configured to: acquire an application configuration file, wherein the configuration file comprises a code file for describing an application page, the code file comprises an access mode description statement, and the access mode description statement is configured to describe a corresponding relationship between variable data and an access mode in a corresponding page; acquire a page request which comprises a page identifier and variable data; acquire page data corresponding to the page identifier, from the configuration file; and display a page indicated by the page identifier, in the situation where an application is not installed on an operating system, according to the access mode description statement in a code file of the page indicated by the page identifier and in accordance with page data corresponding to the page identifier and variable data in the page request.

According to a seventh aspect of the present disclosure, there is provided a computer-readable storage medium having stored therein at least one instruction to be loaded and executed by a processor to execute operations in the application configuration file generation method in the first aspect.

According to an eighth aspect of the present disclosure, there is provided a computer-readable storage medium having stored therein at least one instruction to be loaded and executed by a processor to execute operations in the application page display method in the second aspect.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, used to explain the principles of the present disclosure.

DETAILED DESCRIPTION

The present disclosure will be described in further detail, with reference to the accompanying drawings, to present the objective, technical solutions, and advantages of the present disclosure clearer. Herein, the examples of the present and illustration thereof are intended to explain the present disclosure rather than limit the present disclosure.

The present disclosure provides an application configuration file generation method and apparatus, an application page display method and apparatus, and a storage medium. The embodiments of the present disclosure will be illustrated in detail with reference to the accompanying drawings below.

Figure 1:
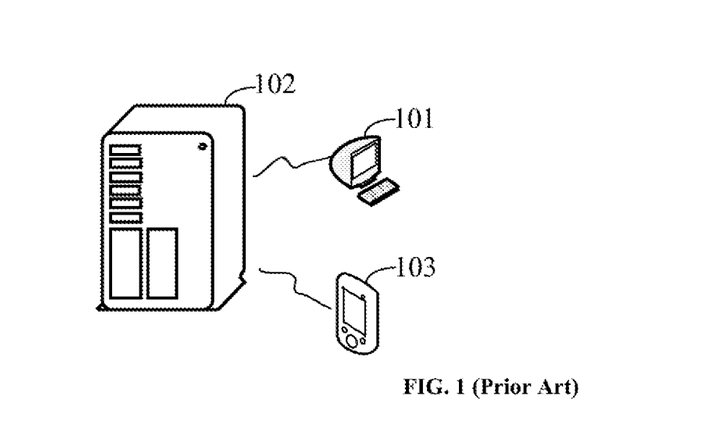
FIG. 1 is a schematic diagram showing an implementation environment according to an example of the present disclosure.

FIG. 1 is a diagram of an implementing environment shown according to one example. As shown in FIG. 1, this implementing environment includes a first terminal 101, a server 102 and a second terminal 103. Here, both the first terminal 101 and the second terminal 103 are connected to the server 102 through a network. For example, the first terminal 101 and the second terminal 103 may have different operating systems such as Android™, iOS™, etc.

The first terminal 101 may be a device such as a computer or a tablet and is mainly used for application development by application developers. Software development tool is installed in the first terminal 101 and the application developer may develop an application with this software development tool. Further, after receiving a code input by the application developer, the first terminal 101 generates a source code file, and compiles it. A code file obtained after compilation is an application configuration file, for example a rpk file. Finally, the first terminal 101 sends the application configuration file to the server 102. One application usually has a plurality of pages and each page corresponds to one code file (for example, a js file) in the configuration file. That is, the configuration file of one application contains a plurality of code files, and each code file contains page data and running logic to display a corresponding page.

This page data may be implemented based on HTML5 (Hyper Text Markup Language 5) or a language similar to HTML5 and may comprise display elements which need to be displayed in the application page, layout information about the display elements, a resource address required to display these display elements and the like. The layout information may comprise information such as the position, dimension, colour, etc. of each display element. The resource address may be an address of a local resource of the terminal or a link address of a resource stored on the server. This running logic is implemented based on a Java Script language and may comprise a redirect page address when the display element is clicked, an operation that needs to be executed when the display element is clicked, an operation that needs to be executed when the page is scrolled up and down or the like.

The server 102 receives the application configuration file sent by the first terminal 101 and saves and releases it for the second terminal 103 to download and use.

The second terminal 103 may be one of multiple types of devices such as a mobile phone, a computer and a tablet. The operating system of the second terminal 103 may be the Android system, the Symbian system or the like. The second terminal 103 may acquire the application configuration file from the server 102; then invoke, based on this application configuration file, a framework file embedded into the operating system, which may parse a statement in the configuration file into HTML5-based display elements; convert the display elements obtained through parse into a native view, according to a corresponding relationship between the HTML5-based display element set in the framework file and the native view; render a page according to the view obtained through conversion to generate a native page; and display the native page so that the application runs with the above process. In addition, the application does not need to be installed during the running process of the terminal application. Moreover, after acquiring the application configuration file from the server 102, the second terminal 103 may also cache the acquired application configuration file locally in order to directly acquire it locally next time.

Here, the framework file may be implemented by the code which implements the above functionalities and embedded, as one or more program modules, into the operating system, which can be embedded by an operating system developer when the operating system is released or may also be installed into the operating system by a user himself.

Exemplarily, the second terminal 103 may comprise an execution layer, a conversion layer and a native layer. The execution layer parses the statement in the configuration file into a plurality of display elements based on the HTML5 language and generates a virtual tree structure comprising the plurality of display elements. The conversion layer converts the plurality of display elements in the virtual tree structure to a plurality of views which can be recognized by the native layer to obtain another tree structure comprising the plurality of views. The native layer renders the page according to this tree structure so that the native page may be displayed.

The application page is displayed after being converted to the native page. In the situation where the application is not installed on the terminal, the user is given an experience of browsing an installed application page, which may not only save the storage space but also guarantee the display effect of the native page.

Of course, the second terminal 103 may also directly display the page based on the parsed display elements after parsing the statement in the configuration file into the HTML5-based display elements, without conversion between the parsed display elements and the native views.

However, in the process that the second terminal 103 displays the page, if there is external data (data coming from outside of this application) transmitted to this page, the terminal will replace corresponding page data in the configuration file with the external data and then display the page based on the replaced page data, which may result in abnormal page display with certain security risks. Therefore, the present disclosure provides a data access authority control mode, so that the terminal may determine, according to certain policy, whether to replace the page data in the configuration file with the external data, thereby improving the security and reliability to run the application in the situation where the application is not installed.

Figures 2, 3:
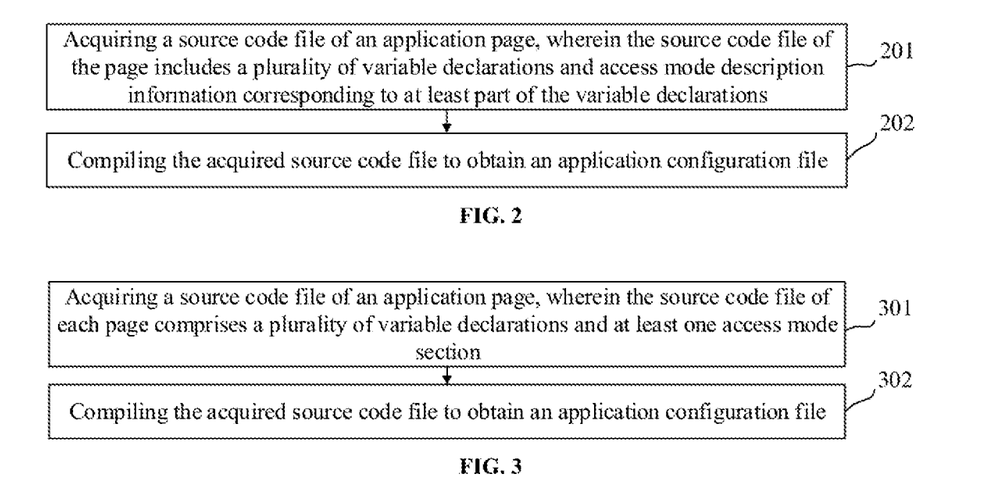
FIG. 2 is a flow chart illustrating an application configuration file generation method according to an example of the present disclosure.
FIG. 3 is a flow chart illustrating an application configuration file generation method according to an example of the present disclosure.

FIG. 2 is a flow chart illustrating an application configuration file generation method according to one example. As shown in FIG. 2, this method may include the following steps.

In step 201, a source code file of an application page is acquired. For example, an application include a plurality of pages and each page corresponds to one source code file. The source code file of each page include a plurality of variable declarations and access mode description information corresponding to at least part of the variable declarations. The variable declaration is configured to declare a variable. The access mode description information is configured to indicate an access mode of variable data indicated by the corresponding variable declaration.

Alternatively or additionally, it is also possible that only a part of page source files comprises the access mode description information.

Alternatively or additionally, the access modes may comprise three types of access modes, i.e., public, private, and restricted access (such as protected or package). Public means that replacement (i.e., override) is permitted, private means that replacement is not permitted, and restricted means that data replacement within the application page is permitted.

Alternatively or additionally, the access mode description information may be a part of the code in the source code file and may also be the part other than the code in the source code file, for example an annotation.

In a possible implementation method, each variable declaration in the source code file corresponds to access mode description information. While in another possible implementation method, a part of variable declarations in the source code file corresponds to access mode description information and the other part of variable declarations does not have corresponding access mode description information.

In step 202, the acquired source code file is compiled to obtain an application configuration file. The application configuration file may be configured to display or generate same pages on different devices installed with different operating systems.

The configuration file may include a code file for describing the application page, each code file comprises an access mode description statement, and the access mode description statement is configured to describe a corresponding relationship between variable data and an access mode in a corresponding page.

Alternatively or additionally, the method may further comprise: sending the application configuration file to the server.

According to the method in the present disclosure, the access mode description information corresponding to at least part of the variable declaration is set in the source code file of the application page, such that the application configuration file obtained after the compilation of the source code file includes the code file for describing the application page and the code file includes the access mode description statement. Thus, the access mode of the variable data can be differentiated by the access mode description statement, thereby avoiding all the access modes of the variable data in the page being directly overridden, reducing the possibility of data tampering, ensuring the normal display of the pages, and improving security.

Among all the optional technical solutions described above, any combination may be adopted to form optional embodiments of the present disclosure and will not be repeated herein.

FIG. 3 is a flow chart illustrating an application configuration file generation method according to an example of the present disclosure. In the example shown in FIG. 3, the access mode description information is access mode sections and is part of the code in the source code file. As shown in FIG. 3, the method may include the following steps.

In step 301, a source code file of an application page is acquired.

In one or more embodiments, an application comprises a plurality of pages and each page corresponds to one source code file. Each source code file comprises a plurality of variable declarations and at least one access mode section.

Based on actual requirement, each access mode section can correspond to at least one of the variable declarations in the source code file.

It should be noted that, in practice, it is also possible that only a part of page source files comprises the access mode section.

In one or more examples, each access mode section corresponds to one access mode. Here, the access modes may comprise three types of access modes, i.e., public, private, and restricted (such as protected or package). Public means that replacement (i.e., override) is permitted, private means that replacement is not permitted, and restricted means that data replacement within the application page is permitted.

Correspondingly, the access mode section may also include three types of access sections, i.e., a public section, a private section and a restricted section. The access mode of the variable data indicated by the variable declaration corresponding to the public section is that replacement (i.e., override) is permitted. The access mode of the variable data indicated by the variable declaration corresponding to the private section represents is that replacement is not permitted. The access mode of the variable data indicated by the variable declaration corresponding to the restricted section is that replacement with data from the application page is permitted.

In practice, the above access mode section and the variable declaration corresponding to the access mode section may be defined in a page class. In the code file, the definition of the page class is usually at the beginning of the code. For example, the page is defined in Javascritpt: page1:

```
export default {
    public: { variablePublic1: "" },
    protected: { variableProtected1: "" },
    private: { variablePrivate1: "" }
}.
```

The above code indicates that the page1 class declares three variables: variablePublic1, viableProtected1 and vriablePrivate1. These three variables are declared in different access mode sections and thus access modes which variable data corresponding thereto are different. For example, the access mode of the variable data corresponding to variablePublic1 is that replacement is permitted, the access mode of the variable data corresponding to variableProtected1 is that only data replacement within the application page is permitted, and the access mode of the variable data corresponding to variablePrivate1 is that replacement is not permitted.

Optionally, the code file may also comprise a non-access mode section and a variable declaration corresponding to the non-access mode section. The non-access mode section comprises at least one of a data section and an attribute section. That is, in the page class defined in the source code file, sections in addition to the access mode section may also be defined. An access mode of a variable indicated by the variable declaration corresponding to the non-access mode section can be a default mode, for example, public.

In step 302, the acquired source code file is compiled to obtain an application configuration file.

In practice, the application configuration file may be a rpk file. Since one application comprises a plurality of pages and each page corresponds to one source code file (such as a js file), the configuration file may comprise a plurality of page code files, each code file comprises an access mode description statement (which, for example, may be a statement based on the Java Script language), and the access mode description statement is configured to describe a corresponding relationship between variable data and an access mode in a corresponding page. A code file corresponding to one page will define one object. A page object may be derived by running this code file by a framework in the terminal and corresponding page data will be added to this page object, so that the corresponding page may be displayed.

In this embodiment, the step 302 may comprise:

Preserving variable declarations and access mode description information in a source code file of a corresponding page in the code file. That is, preserving the variable declarations and the access mode section in the source code file of the corresponding page in the code file.

That is, the access mode description statement also contains at least one access mode section and a variable declaration corresponding to the access mode section. The access mode section and the variable declaration corresponding to the access mode section in the access mode description statement are the same as the access mode section and the variable declaration corresponding to the access mode section in the source code file of this page.

For example, in the compiled code file of the page1, the following statements also exist:

```
export default {
    public: { variablePublic1: "" },
    protected: { variableProtected1: "" },
    private: { variablePrivate1: "" }
}.
```

Optionally, the method may further include:

sending the application configuration file to the server. The server receives the application configuration file and saves and releases it for the terminal to download and use.

According to the method in the present disclosure, the access mode sections are set in the source code file of the application page and variables are declared in the access mode sections, such that the application configuration file obtained after the compilation of the source code file includes the code file for describing the application page and the code file includes the access mode description statement. Thus, the access mode of the variable data can be differentiated by the access mode description statement, thereby avoiding all the access modes of the variable data in the page being directly overridden, reducing the possibility of data tampering, ensuring the normal display of the pages and improving security.

Figure 4:
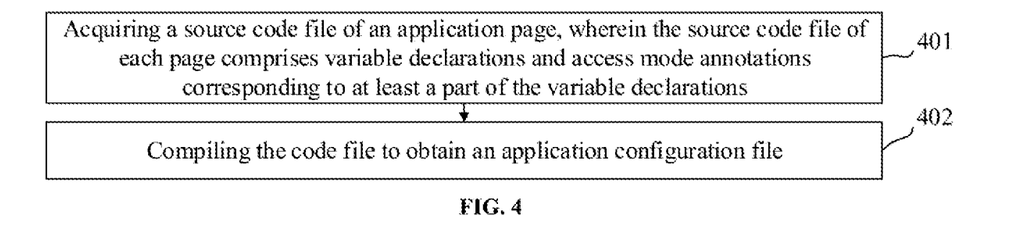
FIG. 4 is a flow chart illustrating an application configuration file generation method according to an example of the present disclosure.

FIG. 4 is a flow chart illustrating an application configuration file generation method according to an example of the present disclosure. In the example shown in FIG. 4, the access mode description information is access mode annotations and is not a part of the code in the source code file. As shown in FIG. 4, the method may include the following steps.

In step 401, a source code file of an application page is acquired.

In one or more embodiments, one application comprises a plurality of pages and each page corresponds to one source code file. The source code file of each page comprises variable declarations and access mode annotations corresponding to at least a part of the variable declarations. That is, the source code file of one page usually comprises a plurality of variable declarations. In a possible implementation, part of the variable declarations has access mode annotations and part of the variable declarations does not have access mode annotations. In another possible implementation, all the variable declarations have access mode annotations.

It should be noted that, in practice, only a part of the source code files of pages has access mode annotations.

The access mode annotation is used for declaring the access mode of the corresponding variable data and may adopt the form of @ access mode.

In this embodiment, the access modes may include three types of access modes, i.e., public, private and restricted (such as protected or package). Correspondingly, the access mode annotations may also include three types: @public means that the access mode of the variable data corresponding to the corresponding variable declaration is that replacement (i.e., override) is permitted; @private means that the access mode of the variable data corresponding to the corresponding variable declaration is that replacement is not permitted; @restricted means that the access mode of the variable data corresponding to the corresponding variable declaration is that replacement with data from within the application page is permitted.

In one possible implementation mode, the access mode annotation may adopt the form of decorator. An example of decorator is a language characteristic in the JAVA SCRIPT language, similar to an annotation in Java language, such as @public, @private, @restricted. In another possible implementation mode, the access mode annotation may adopt the form of DSL (Domain Specific Language), such as //@public, //@private, //@restricted.

In this embodiment, each access mode annotation corresponds to one variable declaration. The access mode annotation does not belong to any part of the source code. During the implementation, the access mode annotation may be located at the same line as the corresponding variable declaration and before the corresponding variable declaration, or the access mode annotation may be located in the above line of the corresponding variable declaration.

In practice, the variable declaration may be defined in the page class of the source code file. In the source code file, the definition of the page class is usually at the beginning of the code.

It is explained below by taking the annotation in the form of DSL (i.e., //@xxx) as an example.
the page is defined in the Javascritpt: page1:

```
export default {
    data: {
        // @public
        variablePublic1: "",
        // @protected
        variableProtected1: "",
        // @private
        variablePrivate1: ""
    }
}.
```

The above code indicates that the page1 class declares three variables: variablePublic1, variableProtected1 and variablePrivate1. As these three variables have different access mode annotations, access modes of variable data that corresponding to the three variables are different. To be specific, the access mode annotation of variablePublic1 is //@public and thus the access mode of the variable data corresponding to variablePublic1 is that replacement is permitted; the access mode annotation of variableProtected1 is //@protected and thus the access mode of the variable data corresponding to variableProtected1 is that only replacement with data from within the application page is permitted; and the access mode annotation of variablePrivate1 is //@private and thus the access mode of the variable data that variablePrivate1 corresponds to is that replacement is not permitted.

Of course, the page1 class may also declare variables without access mode annotations. The variable declaration without the access mode annotation means the access mode of the variable data corresponding to this variable is a default mode, for example, this default mode may be public.

In step 402, the code file is compiled to obtain an application configuration file.

In practice, the application configuration file may be a rpk file. Since one application comprises a plurality of pages and each page corresponds to one source code file (such as a js file), the configuration file may include code files of the plurality of pages, each code file includes an access mode description statement (which, for example may be a statement based on the Java Script language), and the access mode description statement is configured to describe a corresponding relationship between variable data and an access mode in a corresponding page. A code file corresponding to one page will define an object. A page object may be derived by running this code file by a framework in the terminal and corresponding page data is added to this page object, so that the corresponding page may be displayed.

In step 402, compiling the acquired source code file includes:

Converting the access mode annotation to the access mode description statement.

That is, an access mode annotation of the code part, which originally does not belong to the source code file, is converted to the code belonging to the code file of the page.

For example, the access mode description language obtained after conversion may be as follows:

```
export default {
    data: {
        variablePublic1: "",
        variableProtected1: "",
        variablePrivate1: ""
    },
    _descriptor: {
        variablePublic1: { access: "public" },
        variableProtected1: { access: "protected" },
        variablePrivate1: { access: "private" }
    }
}.
```

It can be seen from the above example that all access mode annotations in the source code file of the page are converted to access mode identifiers in the code file of the page. Thus, when the framework operates this code file, a corresponding relationship between the variable data and the access mode can be parsed.

Of course, the access mode description statement in the code file is not limited to this form as long as the corresponding relationship between the variable data and the access mode can be expressed in a manner recognizable to the framework. For example, the manner that the access mode section corresponds to the variable declaration in the example shown in FIG. 2 may also be adopted.

Optionally, the method may further include: sending the application configuration file to the server. The server receives the application configuration file and saves and releases it for the terminal to download and use.

According to the method in the present disclosure, by declaring variables in the source code file of the application page, access mode annotations are set for at least part of the variables, such that the application configuration file obtained after the compilation of the source code file includes the code file for describing the application page and the code file includes the access mode description statement. Thus, the access mode of the variable data can be differentiated by the access mode description statement, thereby avoiding all the access modes of the variable data in the page being directly overridden, reducing the possibility of data tampering, ensuring the normal display of the pages and improving security.

Figures 5, 6:
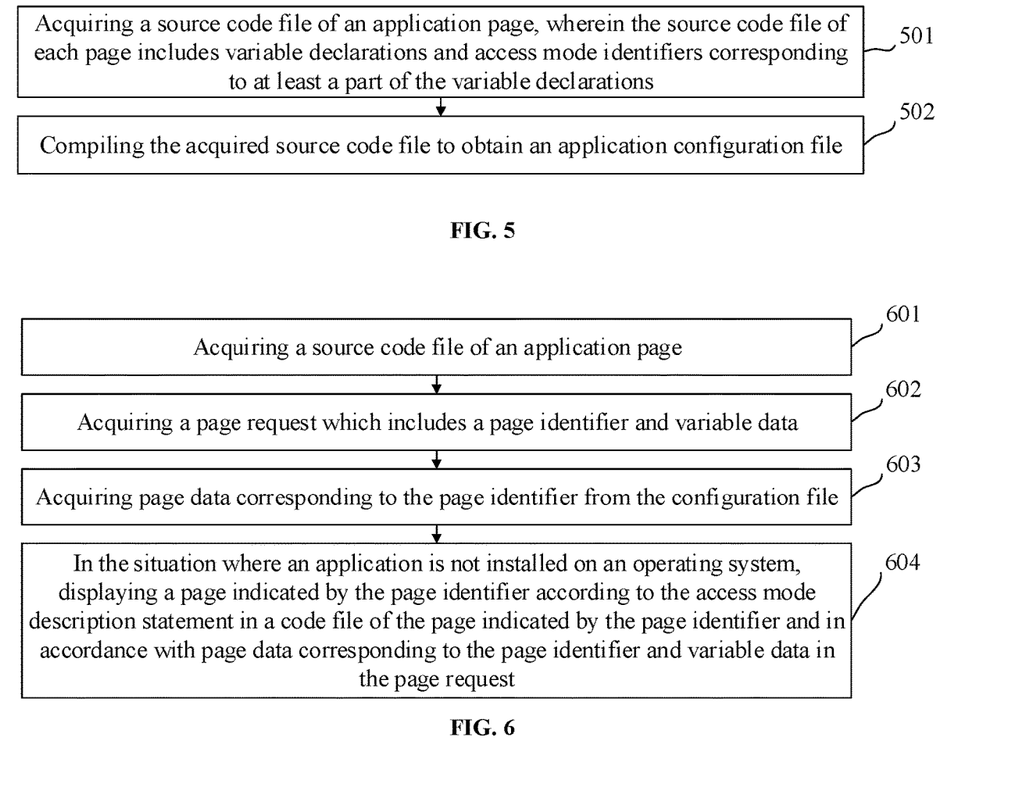
FIG. 5 is a flow chart illustrating an application configuration file generation method according to an example of the present disclosure.
FIG. 6 is a flow chart illustrating an application page display method according to an example of the present disclosure.

FIG. 5 is a flow chart illustrating an application configuration file generation method according to an example of the present disclosure. In the example shown in FIG. 5, the access mode description information is access mode identifiers and is a part of the code in the source code file. As shown in FIG. 5, the method may include the following steps.

In step 501, a source code file of an application page is acquired.

In one or more embodiments, one application includes a plurality of pages and each page corresponds to a source code file. The source code file of each page includes variable declarations and access mode identifiers corresponding to at least a part of the variable declarations. That is, the source code file of a page usually includes a plurality of variable declarations. In a possible implementation, part of the variable declarations has access mode identifiers and part of the variable declarations does not have access mode identifiers. In another possible implementation, all the variable declarations have access mode identifiers.

It should be noted that, in practice, only a part of the source code files of pages has access mode identifiers.

The access mode identifier is configured to represent the access mode of the corresponding variable data. In one or more embodiments, the access modes may include three types of access modes, i.e., public, private, and restricted (such as protected or package). Correspondingly, the access mode identifiers may also include three types. The public identifier means that the replacement (i.e., override) of the access mode of the variable data of the corresponding variable declaration is permitted. The private identifier means that the replacement of the access mode of the variable data of the corresponding variable declaration is not permitted. The restricted identifier means that the replacement of the access mode of the variable data of the corresponding variable declaration with data from within the application page is permitted.

In this embodiment, each access mode identifier corresponds to one variable declaration. The access mode identifier is an attribute of a corresponding variable and is part of the source code.

In practice, the variable declaration may be defined in a page class of the source code file. In the source code file, the definition of the page class is usually at the beginning of the code.

For example, the page is defined in the Javascritpt: page1

```
export default {
    data: {
        variablePublic1: { access: "public" },
        variableProtected1: { access: "protected" },
        variablePrivate1: { access: "private" }
    }
}.
```

The above code indicates that page1 class declares three variables: variablePublic1, variableProtected1 and variablePrivate1. As the access mode identifiers of these three variables have different values, access modes of variable data corresponding to these three variables are different. To be specific, the value of the access mode identifier of variablePublic1 is public and thus the access mode of the variable data that variablePublic1 corresponds to is that replacement is permitted; the value of the access mode identifier of variableProtected1 is protected and thus the access mode of the variable data that variableProtected1 corresponds to is that only replacement with data from the application page is permitted; and the value of the access mode identifier of variablePrivate1 is private and thus the access mode of the variable data corresponding to variablePrivate1 is that replacement is not permitted.

for another example, the page is defined in the Javascritpt: page1

```
export default {
data: { variable1: "",
    variablePublic1: { access: "public" },
        variableProtected1: { access: "protected" },
        variablePrivate1: { access: "private" }
    }.
```

In the above example, in addition to three variables, i.e., variablePublic1, variableProtected1 and variablePrivate1, the variable, i.e., variable1 is also declared. This variable1 does not have a data access identifier, which means that the access mode of the variable data corresponding to variable1 is a default mode. For example, this default mode may be public.

In step 502, the acquired source code file is compiled to obtain an application configuration file.

In practice, the application configuration file may be a rpk file. Since one application includes a plurality of pages and each page corresponds to one source code file (such as a js file), the configuration file includes code files of the multiple pages, each code file includes an access mode description statement (which, for example, may be a statement based on the Java Script language), and the access mode description statement is configured to describe a corresponding relationship between variable data and an access mode in a corresponding page. A code file corresponding to one page will define one object. A page object may be derived by running this code file by a framework in the terminal and corresponding page data is added to this page object, so that the corresponding page may be displayed.

In step 502, compiling the acquired source code file includes:

Preserving the variable declaration and the access mode identifier corresponding to the variable declaration in the source code file of the page as part of the code file of the page.

That is, the code file of the page adopts the same statement as that in the source code file of this page to describe the corresponding relationship between the variable data and the access mode. Therefore, in this embodiment, the code file of the page also contains the variable declarations and at least part of variable declarations correspond to access mode identifiers. The variable declarations and the access mode identifiers corresponding to the variable declarations in the application configuration file are the same as the variable declarations and the access mode identifiers corresponding to the variable declarations in the source code file.

Optionally, the method may further include:

Sending the application configuration file to the server. The server receives the application configuration file and saves and releases it for the terminal to download and use.

According to the method in the present disclosure, by declaring variables in the source code file of the application page, the access mode identifier is set for at least part of the variables, such that the application configuration file obtained after the compilation of the source code file includes the code file for describing the application page and the code file includes the access mode description statement. Thus, the access mode of the variable data can be differentiated by the access mode description statement, thereby avoiding all the access modes of the variable data in the page being directly overridden, reducing the possibility of data tampering, ensuring the normal display of the pages, and improving security.

It should be noted that the steps in the methods in the embodiments shown in FIG. 2 to FIG. 5 are executed by a terminal, such as the first terminal in FIG. 1.

FIG. 6 is a flow chart illustrating an application page display method according to one example. The method may be executed by a terminal. As shown in FIG. 6, the method includes the following steps.

In step 601, a source code file of an application page is acquired.

The configuration file includes a code file for describing an application page, the code file includes an access mode description statement, and the access mode description statement is configured to describe a corresponding relationship between variable data and an access mode in a corresponding page.

The configuration file may be a configuration file generated by adopting the embodiment provided by any one of FIG. 2 to FIG. 5.

In step 602, a page request which includes a page identifier and variable data is acquired.

The page request is configured to request opening the page indicated by the page identifier. In one possible implementation mode, the page request may be triggered to generate by the user clicking an element on the application page or triggered to generate by the user clicking a link on an external page.

In this embodiment, the variable data is composed of two parts, i.e., a variable name and a corresponding value (i.e., data). A page request may include at least one variable data.

In step 603, page data corresponding to the page identifier is acquired from the configuration file.

In step 604, in the situation where an application is not installed on an operating system, a page indicated by the page identifier is displayed according to the access mode description statement in a code file of the page indicated by the page identifier and in accordance with page data corresponding to the page identifier and variable data in the page request.

In step 604, whether to replace the page data obtained from the configuration file with the variable data in the page request can be determined according to the access mode description statement. If the page data obtained from the configuration file is replaced with the variable data in the page request, the replaced page data is configured to display the page indicated by the page identifier. If the page data obtained from the configuration file is not replaced with the variable data in the page request, the page data obtained from the configuration file is configured to display the page indicated by the page identifier.

It is easy to understand that when the page request includes more than two variable data, it's necessary to determine the access mode corresponding to each variable data, and then to determine whether the variable data in the page data should be replaced.

According to the method provided in the embodiments of the present disclosure, the application configuration file includes a code file for describing the application page and the code file includes an access mode description statement, so that the access mode of the variable data can be differentiated by the access mode description statement, thereby avoiding all the access modes of the variable data in the page being directly overridden, reducing the possibility of tampering data, ensuring the normal display of the pages, and improving security.

Figure 7:
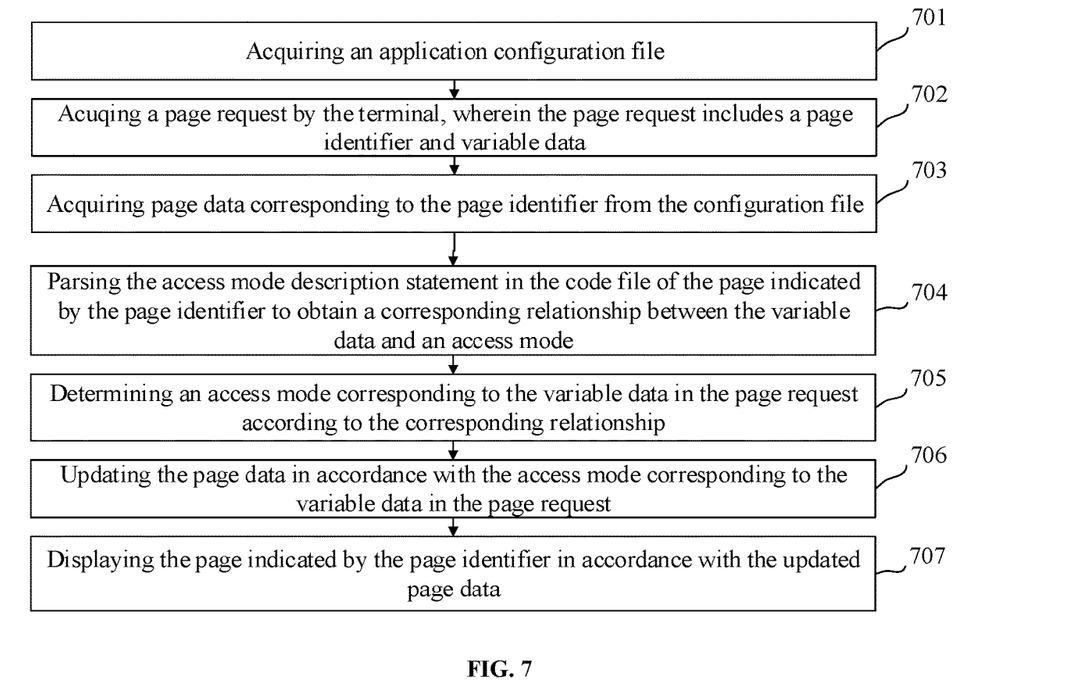
FIG. 7 is a flow chart illustrating an application page display method according to an example of the present disclosure.

FIG. 7 is a flow chart illustrating an application page display method according to one example. The method may be executed by a terminal (for example, the second terminal in FIG. 1). As shown in FIG. 7, the method includes the following steps.

In step 701, an application configuration file is acquired.

Relevant content of the application configuration file may be referenced to step 202, 302, 402 or 502 and the detailed description thereof is skipped herein.

In one possible implementation mode, the terminal may receive the application configuration file sent by a receiver. In another possible implementation mode, the terminal may acquire the application configuration file from local cache.

During implementation, the terminal shows a search entry provided by an operating system and acquires an application identifier input in the search entry. The search entry is used for global search, such as search locally on the terminal and search on the server associated with the terminal.

In one possible implementation mode, the search entry is in a search page. When the terminal displays a main page of the operating system, if it detects that the user scrolls right or scrolls down, the terminal displays search page and shows the search entry in the search page. When the terminal shows the search entry, the user may input a search keyword in the search entry according to his requirements to search information associated with this search keyword on the terminal or the server. This embodiment is used in the scenario of displaying the application page. When the terminal shows this search entry, the user inputs an application identifier that matches an application page to be displayed in the search entry to find the application. Wherein, the application identifier may be mapped to at least one application character or application string.

When the terminal receives the application identifier input by user, it searches locally first; if the application configuration file indicated by the application identifier exists in a local cache, the terminal acquires this application configuration file locally; if the application configuration file indicated by the application identifier does not exist locally, the terminal sends a search request to the server. The search request carries the application identifier. When receiving the search request, the server acquires the corresponding configuration file according to the application identifier and sends the configuration file to the terminal.

In this embodiment, the server stores at least one application configuration file and the configuration file is used for running a corresponding application in the situation where the application is not installed. The configuration file may be uploaded to the server by developers and is released to user to use through the server. In this embodiment, the application configuration file may be a configuration file generated according to the example shown in FIG. 2 and is uploaded to the server by developers.

When receiving the configuration file, the terminal caches the configuration file and shows a designated entry. This designated entry is a search result of the application identifier and is configured to trigger the corresponding application to run in the situation where the application is not installed.

In step 702, the terminal acquires a page request. The page request includes a page identifier and variable data.

The page request is configured to request opening the page indicated by the page identifier. In one possible implementation mode, the page request may be triggered to generate by user clicking an element on the application page or triggered to generate by user clicking a link on an external page.

In this embodiment, the variable data is composed of two parts, i.e., a variable name and a corresponding value (i.e., data). A page request may include at least one variable data.

For example, the page request may include:

page1?variablePublic=111&variableProtected=222, where page1 is a page identifier, variablePublic=111 and variableProtected=222 are variable data, variablePublic and variableProtected are variable names, 111 is a value corresponding to variablePublic, and 222 is a value corresponding to variableProtected.

In step 703, page data corresponding to the page identifier is acquired from the configuration file.

During implementation, the application configuration file may include page data of a plurality of pages of the application, and each page has only one page identifier, such that the corresponding page data can be looked up according to the page identifier.

In step 704, the access mode description statement in the code file of the page indicated by the page identifier is parsed to obtain a corresponding relationship between the variable data and an access mode.

In step 705, an access mode corresponding to the variable data in the page request is determined according to the corresponding relationship.

In step 706, the page data is updated in accordance with the access mode corresponding to the variable data in the page request.

In step 707, the page indicated by the page identifier is displayed in accordance with the updated page data. The page may be the above-mentioned native page.

In a possible implementation, step 707 may include at least one of following operations:

replacing page data corresponding to the same variable name in the configuration file when the access mode corresponding to the variable data is public;

discarding the variable data when the access mode corresponding to the variable data is private;

replacing page data corresponding to the same variable name in the configuration file when the access mode corresponding to the variable data is restricted and the page request is an internal request of the application; and discarding the variable data when the access mode corresponding to the variable data is restricted and the page request is an external request of the application.

Wherein, the internal request of the application refers to that the page request comes from a certain page of the application (a page in the configuration file of the application), such as a page request triggered to generate by user clicking a link in the page. The external request of the application refers to page requests other than the internal request of the application.

Wherein, every time when the framework file in the terminal parses a page, the framework file will register the page. Therefore, the terminal may adopt following manners to determine whether the page request is an internal request of the application or an external request of the application.

When the page request is sent by a registered page, it means that the page request is an internal request of the application.

When the page request is sent by an unregistered page, it means that the page request is an external request of the application.

Optionally, step 707 may include: when the access mode corresponding to the variable data does not exist in the corresponding relationship, the data in the configuration file that has the same variable name as the variable data does will be replaced with the variable data.

For example, in the example shown in FIG. 3, the source code file of the application page may also include a non-access mode section and a variable declaration corresponding to the non-access mode section. Correspondingly, the configuration file obtained after the source code file is compiled may further include a non-access mode section and a variable declaration statement corresponding to the non-access mode section. When the variable date in the page request corresponds to the variable declaration corresponding to the non-access mode section, the variable data having the same variable name in the configuration file as that of the variable date will be replaced with the variable date in the page request.

For another example, in the example shown in FIG. 5, the code file of the page used for describing the application obtained after compilation may also include a variable declaration statement without an access mode identifier. When the variable data in the page request corresponds to the variable declaration without the access mode identifier, the variable data having the same variable name in the configuration file as that of the variable data will be replaced with the variable data in the page request.

Optionally, the method may further include: discarding the variable data if the situation where the data has the same variable name as the variable data does in the page request does not exists in the page data that corresponding to the page identifier.

Through steps from 704 to 707, the page that the page identifier corresponds to can be displayed according to the access mode description statement in the code file of the page that the page identifier belongs to and in accordance with the page data corresponding to the page identifier and the variable data in the page request.

Optionally, the method may further include: acquiring a page request which includes a page identifier but does not include the variable data; and acquiring the page data corresponding to the page identifier from the configuration file and displaying the corresponding page based on the obtained page data in the situation where an application is not installed in the operating system.

According to the method provided in the embodiments of the present disclosure, the application configuration file includes a code file for describing the application page and the code file includes an access mode description statement, so that the access mode of the variable data can be differentiated by the access mode description statement, thereby avoiding all the access modes of the variable data being directly overridden in the page, reducing the possibility of data tampering, ensuring the normal display of the pages, and improving security.

Figure 8:
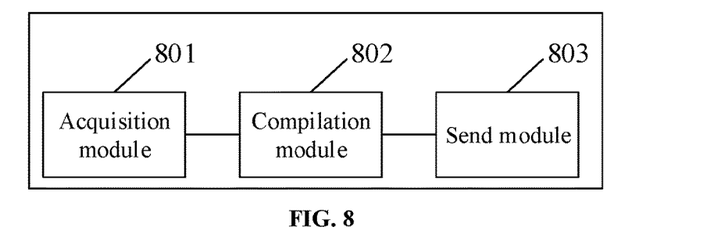
FIG. 8 is a block diagram showing an application configuration file generation apparatus according to an example of the present disclosure.

FIG. 8 is a block diagram showing an application configuration file generation apparatus according to an example of the present disclosure. As shown in FIG. 8, the apparatus includes: an acquisition module 801 and a compilation module 802.

Wherein, the acquisition module 801 is configured to acquire a source code file of an application page. The source code file of the page includes a plurality of variable declarations and access mode description information corresponding to at least part of the variable declarations. The compilation module 802 is configured to compile the source code file acquired by the acquisition module 801 to obtain an application configuration file. The configuration file includes a code file for describing the application page, the code file includes an access mode description statement, and the access mode description statement is configured to describe a corresponding relationship between variable data and an access mode in a corresponding page.

According to the method in the present disclosure, the access mode description information corresponding to at least part of the variable declaration is set in the source code file of the application page, such that the application configuration file obtained after the compilation of the source code file includes the code file for describing the application page and the code file includes the access mode description statement. Thus, the access mode of the variable data can be differentiated by the access mode description statement, thereby avoiding all the access modes of the variable data in the page being directly overridden, reducing the possibility of data tampering, ensuring the normal display of the pages, and improving security.

Wherein, the access mode includes public, private, and restricted.

In a possible implementation, the access mode description information is access mode sections and each of the access mode sections corresponds to at least one of the plurality of variable declarations.

Correspondingly, in this implementation, the compilation module 802 is configured to preserve variable declarations and access mode description information in a source code file of a corresponding page in the code file.

In another possible implementation, the access mode description information is access mode identifiers and at least part of the plurality of variable declarations correspond to one access mode identifier respectively.

Correspondingly, in this implementation the compilation module 802 is configured to preserve variable declarations and access mode description information in a source code file of a corresponding page in the code file.

In yet another possible implementation, the access mode description information is access mode annotations and at least part of the plurality of variable declarations correspond to one access mode annotation.

Furthermore, the access mode annotation may adopt the form of a DSL (domain specific language) or Decorator.

Correspondingly, in this embodiment, the compilation module 802 is configured to convert the access mode annotation to the access mode description statement.

Optionally, the apparatus may further include a send module 803. The send module 803 is configured to send the application configuration file obtained by the compilation module 702 to a server.

Figure 9A:
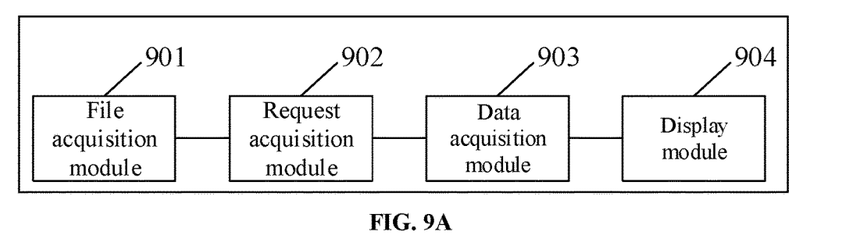
FIG. 9A is a block diagram showing an application page display apparatus according to an example of the present disclosure.

FIG. 9A is a block diagram showing an application page display apparatus according to an example of the present disclosure. As shown in FIG. 9A, the apparatus includes: a file acquisition module 901, a request acquisition module 902, a data acquisition module 903 and a display module 904.

Wherein, the file acquisition module 901 is configured to acquire an application configuration file, wherein the configuration file includes a code file for describing an application page, the code file includes an access mode description statement, and the access mode description statement is configured to describe a corresponding relationship between variable data and an access mode in a corresponding page. The request acquisition module 902 is configured to acquire a page request which includes a page identifier and variable data. The data acquisition module 903 is configured to acquire page data corresponding to the page identifier, from the configuration file. The display module 904 is configured to, in the situation where an application is not installed on an operating system, display a page indicated by the page identifier according to the access mode description statement in a code file of the page indicated by the page identifier and in accordance with page data corresponding to the page identifier and variable data in the page request.

According to the apparatus provided in the embodiments of the present disclosure, the application configuration file includes a code file for describing the application page and the code file includes an access mode description statement, so that the access mode of the variable data can be differentiated by the access mode description statement, thereby avoiding all the access modes of the variable data in the page being directly overridden, reducing the possibility of data tampering, ensuring the normal display of the pages, and improving security.

Figure 9B:
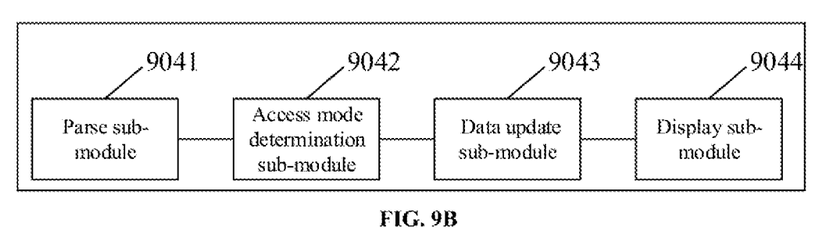
FIG. 9B is a block diagram showing a display module according to an example of the present disclosure.

As shown in FIG. 9B, the display module 904 may include: a parse sub-module 9041, an access mode determination sub-module 9042, a data update sub-module 9043 and a display sub-module 9044.

Wherein, the parse sub-module 9041 is configured to parse the access mode description statement in the code file of the page indicated by the page identifier to obtain a corresponding relationship between the variable data and an access mode. The access mode determination sub-module 9042 is configured to determine, according to the corresponding relationship, an access mode corresponding to the variable data in the page request. The data update sub-module 9043 is configured to update the page data in accordance with the access mode corresponding to the variable data in the page request. The display sub-module 9044 is configured to display, in accordance with the updated page data obtained by the data update sub-module, the page indicated by the page identifier.

Furthermore, the data update sub-module 9043 may be configured to execute at least one of the following operations:

replacing page data corresponding to the same variable name in the configuration file when the access mode corresponding to the variable data is public;

discarding the variable data when the access mode corresponding to the variable data is private;

replacing page data corresponding to the same variable name in the configuration file when the access mode corresponding to the variable data is restricted and the page request is an internal request of the application; and discarding the variable data when the access mode corresponding to the variable data is restricted and the page request is an external request of the application.

Optionally, the data update sub-module 9043 may further be configured to replace data, which has the same variable name as the variable data does in the configuration file, with the variable data when the access mode corresponding to the variable data does not exist in the corresponding relationship.

With respect to the apparatus of the above embodiment, the specific method of operation executed by each module has been described in detail in the embodiment of the method, and will not be described in detail herein.

It should be noted that the application configuration file generation apparatus provided by the above embodiment is exemplified only by the division of the above functional modules when the apparatus generates the application configuration file. In practice, the above-described functions may be assigned and completed by different functional modules in accordance with requirements. That is, the internal structure of the terminal can be divided into different functional modules to complete all or part of the functions described above. In addition, the application configuration file generation apparatus and the application configuration file generation method provided in the above embodiment follow the same principal, and the specific implementation process thereof can be referenced to the method embodiment for detail and will not be repeated herein.

Likewise, the application page display apparatus provided by the above embodiment is exemplified only by the division of the above functional modules when the apparatus displays pages. In practice, the above-described functions may be assigned and completed by different functional modules in accordance with requirements. That is, the internal structure of the terminal can be divided into different functional modules to complete all or part of the functions described above. In addition, the application page display apparatus and the application page display method provided in the above embodiment follow the same principal, and the specific implementation process thereof can be referenced to the method embodiment for detail and will not be repeated herein.

Figure 10:
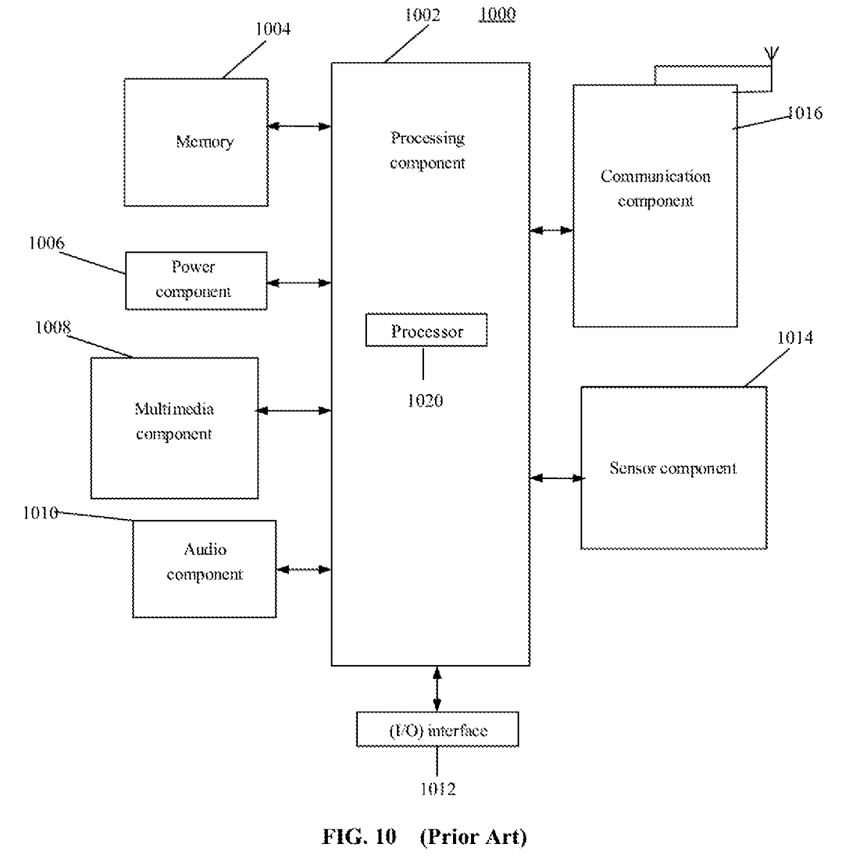
FIG. 10 is a block diagram showing an application configuration file generation apparatus or an application page display apparatus according to an example of the present disclosure.

FIG. 10 is a block diagram showing an application configuration file generation apparatus or an application operation apparatus 1000 according to an example. For example, the apparatus 1000 may be a mobile phone, a computer, a digital broadcast terminal, a message transceiver device, a game console, a tablet device, a medical equipment, a fitness equipment, a personal digital assistant, or the like.

Referring to FIG. 10, the apparatus 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the apparatus 1000, such as the operations associated with display, telephone calls, data communications, camera operations, and recording operations. The processing component 1002 may include one or more processors 1020 to execute instructions to complete all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the apparatus 1000. Examples of such data include instructions for any applications or methods operated on the apparatus 1000, contact data, phonebook data, messages, pictures, video, etc. The memory 1004 may be implemented with any types of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic, or optical disk.

The power component 1006 provides power to various components of the apparatus 1000. The power component 1006 may include a power management system, one or more power sources, and any other components associated with the generation, management, and power distribution of the apparatus 1000.

The multimedia component 1008 includes providing a screen for output interface between the apparatus 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense duration and pressure associated with the touch or swipe action. In some embodiments, the multimedia component 1008 includes a front camera and/or a rear camera. When the apparatus 1000 is in an operation mode, such as a photographing mode or a video mode, the front camera and/or the rear camera may receive external multimedia data. Each front camera and rear camera may be a fixed optical lens system or have focus and optical zoom capability.

The audio component 1010 is configured to output and/or input audio signals. For example, the audio component 1010 includes a microphone ("MIC") configured to receive an external audio signal when the apparatus 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a start button, and a lock button.

The sensor component 1014 includes one or more sensors to provide the apparatus 1000 with status assessments of various aspects. For instance, the sensor component 1014 may detect an on/off status of the apparatus 1000, component relative positioning, e.g., the display device and the mini keyboard of the apparatus 1000. The sensor component 1014 can also detect a position change of the apparatus 1000 or a component of the apparatus 1000, presence or absence of user contact with the apparatus 1000, orientation or acceleration/deceleration of the apparatus 1000, and a temperature change of the apparatus 1000. The sensor component 1014 may include a proximity sensor configured to detect the presence of nearby objects without any physical contact. The sensor component 1014 may also include a light sensor, such as a CMOS or CCD image sensor, used in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the apparatus 1000 and other devices. The apparatus 1000 can access a wireless network based on a communication standard, such as WiFi, 2G, or 3G, or a combination thereof. In one example, the communication component 1016 receives broadcast signals or broadcast associated information from an external broadcast management system via a broadcast channel. In one example, the communication component 1016 further includes a near field communication (NFC) module to promote short-range communication.

In examples, the apparatus 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to execute the method shown in any of FIGS. 2-5 when the apparatus 1000 is an application configuration file generation apparatus or to execute the method shown in any of FIGS. 6-7 when the apparatus 500 is an application page display apparatus.

In examples, there is also provided a non-transitory computer-readable storage medium including instructions, such as the memory 1004 including instructions. These instructions may be loaded and executed by the processor 1020 in the apparatus 1000 to complete the method shown in any one of FIGS. 2-5 or the method shown in FIG. 6 or FIG. 7. For example, the non-transitory computer-readable storage medium may be a ROM, a RAM, a CD-ROM, a magnetic tape, a floppy disc, an optical data storage device, or the like.

A computer-readable storage medium, when instructions in the storage medium are executed by a processor of a terminal, has the terminal execute the method in the example shown in any one of FIGS. 2-5. The method includes:

acquiring a source code file of an application page, wherein the source code file of the page includes a plurality of variable declarations and access mode description information corresponding to at least part of the variable declarations; and compiling the acquired source code file to obtain an application configuration file, wherein the configuration file includes a code file for describing the application page, the code file includes an access mode description statement, and the access mode description statement is configured to describe a corresponding relationship between variable data and an access mode in a corresponding page.

Wherein, the access modes may include public, private, and restricted.

In a possible implementation, the access mode description information is access mode sections and each of the access mode sections corresponds to at least one of the plurality of variable declarations.

Correspondingly, in this embodiment, the source code file acquired through complication includes: preserving variable declarations and access mode description information in a source code file of a corresponding page in the code file.

In another possible implementation, the access mode description information is access mode identifiers and at least part of the plurality of variable declarations correspond to one access mode identifier respectively.

Correspondingly, in this embodiment, the source code file acquired through complication includes: preserving variable declarations and access mode description information in a source code file of a corresponding page in the code file.

In yet another possible implementation, the access mode description information is access mode annotations and at least part of the plurality of variable declarations correspond to one access mode annotation respectively.

Optionally, the access mode annotation adopts the form of a domain specific language or decorator.

Correspondingly, in this embodiment, compiling the acquired source code file includes: converting the access mode annotation to the access mode description statement.

Optionally, the method may further include: sending the application configuration file to a server.

A computer-readable storage medium, when instructions in the storage medium are executed by a processor of a terminal, has the terminal execute the method in the example shown in FIG. 6 or FIG. 7. The method includes:

acquiring an application configuration file, wherein the configuration file includes a code file for describing an application page, the code file includes an access mode description statement, and the access mode description statement is configured to describe a corresponding relationship between variable data and an access mode in a corresponding page;

acquiring a page request which includes a page identifier and variable data;

acquiring page data corresponding to the page identifier from the configuration file; and displaying a page indicated by the page identifier, in the situation where an application is not installed on an operating system, according to the access mode description statement in a code file of the page indicated by the page identifier and in accordance with page data corresponding to the page identifier and variable data in the page request.

In a possible implementation, displaying a page indicated by the page identifier according to the access mode description statement in a code file of the page indicated by the page identifier and in accordance with page data corresponding to the page identifier and variable data in the page request includes:

parsing the access mode description statement in the code file of the page indicated by the page identifier to obtain a corresponding relationship between the variable data and an access mode;

determining, according to the corresponding relationship, an access mode corresponding to the variable data in the page request;

updating the page data in accordance with the access mode corresponding to the variable data in the page request; and displaying, in accordance with the updated page data, the page indicated by the page identifier.

Optionally, updating the page data in accordance with the access mode corresponding to the variable data in the page request includes at least one of the following operations:

when the access mode corresponding to the variable data is public, replacing page data corresponding to the same variable name o in the configuration file;

when the access mode corresponding to the variable data is private, discarding the variable data;

when the access mode corresponding to the variable data is restricted and the page request is an internal request of the application, replacing page data corresponding to the same variable name in the configuration file; and when the access mode corresponding to the variable data is the restricted access mode and the page request is an external request of the application, discarding the variable data.

Optionally, updating the page data in accordance with the access mode corresponding to the variable data in the page request includes: when the access mode corresponding to the variable data does not exist in the corresponding relationship, replacing data, which has the same variable name as the variable data in the configuration file does, with the variable data.

Other embodiments of the present disclosure will be apparent to those skilled in the art after consideration of the specification and practice of the invention disclosed here. This application is intended to cover any variations, uses, or adaptations of the present disclosure following the general principles thereof and including such departures from the present disclosure as come within known or customary practice in the art. It is intended that the specification and examples be considered exemplary only. The true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for obtaining application configuration file, comprising:
   acquiring a source code file of an application page, wherein the source code file of the page comprises a plurality of variable declarations and access mode description information corresponding to at least part of the plurality of variable declarations; and
   compiling the acquired source code file to obtain an application configuration file, wherein the configuration file comprises a code file for describing the application page, the code file comprises an access mode description statement, and the access mode description statement is configured to describe a corresponding relationship between variable data and an access mode in a corresponding page,
   wherein the access mode description information comprises a plurality of access mode sections being part of code in the source code file; and wherein each of the access mode sections corresponds to at least one of the plurality of variable declarations.

2. The method according to claim 1, wherein different access mode sections correspond to different variable declarations.

3. The method according to claim 1, wherein compiling the acquired source code file comprises: preserving variable declarations and access mode description information in a source code file of a corresponding page in the code file.

4. The method according to claim 1, wherein the access mode description information further comprises access mode identifiers; and wherein at least part of the plurality of variable declarations respectively correspond to one access mode identifier.

5. The method according to claim 4, wherein compiling the acquired source code file comprises: preserving variable declarations and access mode description information in a source code file of a corresponding page in the code file.

6. The method according to claim 1, wherein the access mode description information further comprises access mode annotations; and wherein at least part of the plurality of variable declarations correspond respectively to one access mode annotation.

7. The method according to claim 6, wherein the access mode annotation adopts the form of a domain specific language or decorator.

8. The method according to claim 6, wherein compiling the acquired source code file comprises: converting the access mode annotation to the access mode description statement.

9. The method according to claim 1, wherein the access modes comprise public, private, and restricted.

10. The method according to claim 1, further comprising: sending the application configuration file to a server.

11. An application page display method, comprising:
    acquiring an application configuration file, wherein the configuration file comprises a code file for describing an application page, the code file comprises an access mode description statement, and the access mode description statement is configured to describe a corresponding relationship between variable data and an access mode in a corresponding page;
    acquiring a page request, wherein the page request comprises a page identifier and variable data;
    acquiring page data corresponding to the page identifier from the configuration file;
    parsing, when an application is not installed on an operating system, the access mode description statement in a code file of a page indicated by the page identifier to obtain a corresponding relationship between the variable data and an access mode;
    determining, according to the corresponding relationship, the access mode corresponding to the variable data in the page request;
    updating the page data in accordance with the access mode corresponding to the variable data in the page request; and
    displaying, in accordance with the updated page data, the page indicated by the page identifier.

12. The method according to claim 11, wherein updating the page data in accordance with the access mode corresponding to the variable data in the page request comprises at least one of the following operations:
    replacing page data corresponding to the same variable name in the configuration file when the access mode corresponding to the variable data is public;
    discarding the variable data when the access mode corresponding to the variable data is private;
    replacing page data corresponding to the same variable names in the configuration file when the access mode corresponding to the variable data is restricted and the page request is an internal request of the application; and
    discarding the variable data when the access mode corresponding to the variable data is restricted and the page request is an external request of the application.

13. The method according to claim 11, wherein updating the page data in accordance with the access mode corresponding to the variable data in the page request comprises:
    replacing data, which has the same variable name as the variable data does in the configuration file, with the variable data, when the access mode corresponding to the variable data does not exist in the corresponding relationship.

14. A computer-readable storage medium having stored therein at least one instruction which is loaded and executed by a processor to execute acts comprising:
- acquiring a source code file of an application page, wherein the source code file of the page comprises a plurality of variable declarations and access mode description information corresponding to at least part of the plurality of variable declarations; and
- compiling the acquired source code file to obtain an application configuration file, wherein the configuration file comprises a code file for describing the application page, the code file comprises an access mode description statement, and the access mode description statement is configured to describe a corresponding relationship between variable data and an access mode in a corresponding page,
- wherein the access mode description information comprises a plurality of access mode sections being part of code in the source code file; and wherein each of the access mode sections corresponds to at least one of the plurality of variable declarations.

* * * * *